Aug. 18, 1970    M. E. GRANTHAM    3,524,715
FLUID PUMP

Filed Aug. 7, 1968    2 Sheets-Sheet 1

INVENTOR:
MAX EDWARD GRANTHAM,
By: Mason, Kolehmainen, Rathburn &
Wyss; ATTORNEYS.

Aug. 18, 1970  M. E. GRANTHAM  3,524,715
FLUID PUMP
Filed Aug. 7, 1968  2 Sheets-Sheet 2
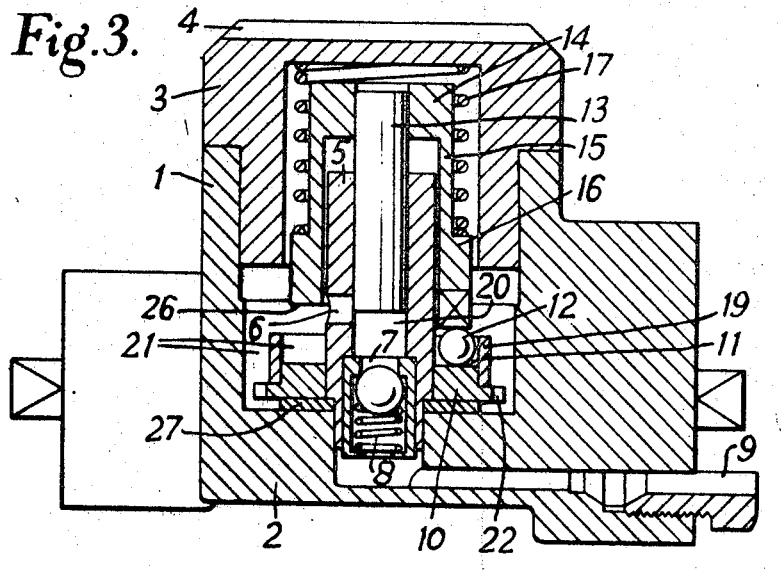
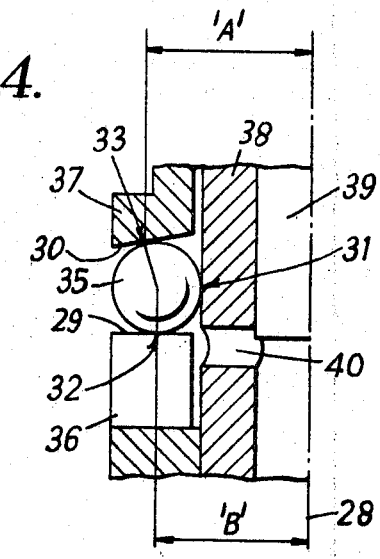
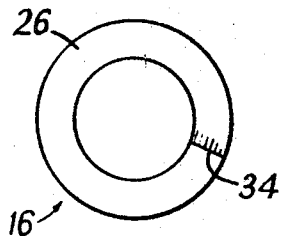
INVENTOR:
MAX EDWARD GRANTHAM
BY: Mason, Kolehmainen, Rathburn
& Wyss, ATTORNEYS.

3,524,715
FLUID PUMP
Max Edward Grantham, Plymouth, England, assignor to Tecalemit (Engineering) Limited, Plymouth, Devon, England
Filed Aug. 7, 1968, Ser. No. 750,927
Claims priority, application Great Britain, Aug. 18, 1967, 38,242/67
Int. Cl. F04b 19/22, 9/04
U.S. Cl. 417—471                12 Claims

ABSTRACT OF THE DISCLOSURE

A fluid pump comprises a piston (13) reciprocable in a cylinder (5) against a biasing force (helical spring 17). The pump includes a cam system which may be formed by a ball (12) rotated by a cam body (10) against a helical cam face (26).

The cam system embraces the cylinder and provides a compact construction. The ball support (11) may be bevelled to provide a low torque pure rolling action.

The pump is of utility in lubrication systems (FIG. 3).

---

This invention relates to cam operated reciprocating fluid pumps.

In fluid systems, for example lubrication systems, an essential part is a pump for moving the fluid through the system.

The invention provides a fluid pump comprising a cylinder having input and output ports and a piston reciprocable within the cylinder against a biasing force by a helical cam system embracing the cylinder.

The invention allows a pump to be constructed in a compact form and small size with the pumping mechanism centrally positioned. The fundamental working parts of the pump are arranged about a centre line.

Preferably the cam system has a helical cam surface cooperating with a cam member revolvable relative to the helical cam surface. A convenient and compact method of connecting the piston with the cam system is to form an extension from the piston extending outside the cylinder so as to embrace the latter. This extension is then moved by the cam system and motion is transmitted to the piston.

Preferably the cam member is a ball between the cam surface and a ball support surface. The use of a ball allows a low friction contact to be achieved between the parts of the cam system. The ball may be revolved by a cam body embracing the cylinder.

A particular feature of the invention is that the ball support surface may be bevelled to give a ball contact path substantially equal in length to the contact path on the cam surface. This allows the ball to have a substantially pure rolling action between the two surfaces and gives the pump a comparatively low torque characteristic which is of value.

Movement of the ball, when the support surface is not bevelled, may be limited by a shield positioned outwardly of the ball path. The output port may include a non-return valve and although the input port may also include a non-return valve the pump of the invention may be constructed so that the input port is closed by the piston moving past it during the pump stroke. It will be appreciated that the non-return valve for the pump in the output line may be provided externally to the pump itself.

The biasing force for the piston may be provided by a spring, for example a helical spring, and the helical cam surface preferably has one drop-off. This latter provision allows the pump to be worked with a relatively low power input but those skilled in the art will appreciate that the dimensions of the pump and associated gears of the pump can be selected so as to provide a desired output with the power input available.

Embodiments of the invention will now be described by way of example with reference to the accompanying diagrammatic drawings in which:

FIG. 3 is a sectional view of the pump along the line B—B on FIG. 1 in the direction of the arrows.

FIG. 4 is an enlarged sectional view of a cam system with a bevelled ball support surface, and FIG. 5 is an end view of the cam surface.

Figure 1:
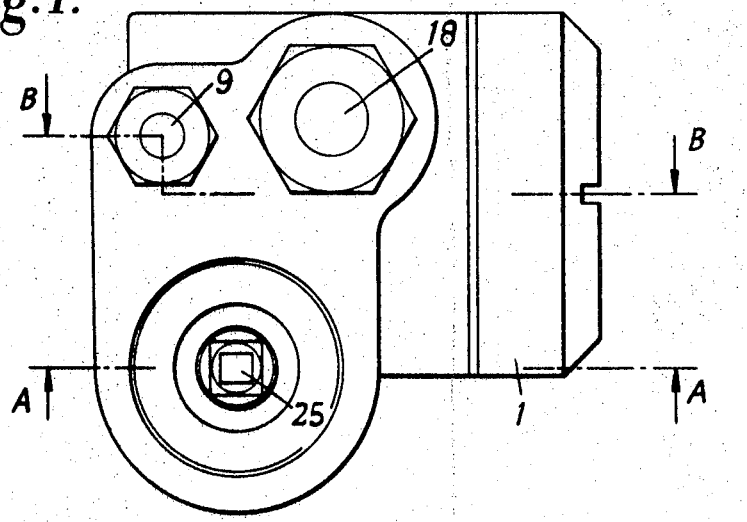
FIG. 1 shows an end view of the pump.

Referring first to the sectional view of FIG. 3 it is seen that the pump includes a housing having a substantially cylindrical housing wall 1 integral with a housing base 2 at one end of the wall 1. The other end of the housing is closed by a cover plate 3 which makes a push fit with the inner surface of the wall 1 and retained therein by the use of a locking fluid. Alternatively the plate can be screwed into the wall, the co-operating surfaces being suitably threaded. The cover plate allows the placement and removal of the parts of the pump disposed within the housing and a groove 4 is optionally provided on the side of the plate 3 external to the housing so that the plate can be rotated by a screwdriver or similar tool.

A cylinder 5 is attached to and extends from the housing base 2 substantially coaxially with the housing wall 1 to a point spaced from the cover plate 3. An input port 6 is formed in the wall of cylinder 5 and an output port 7 at the end of the cylinder 5 attached to the housing base 12. The output port communicates with a non-return valve 8 mounted in the cylinder and an output pipe 9 which extends from the housing. Between the cylinder 5 and the housing wall 1 is formed a pump space 21 which communicates with an input pipe 18 (see FIGS. 1 and 2) attached to the housing wall.

An annular body 10 is coaxially arranged embracing the cylinder 5 and journalled on the external surface of the cylinder around which the cam is rotatable. This annular body abuts the housing base 2 and has a ball support surface 11. A washer 27 of polytetrafluoroethylene is positioned between the body 10 and base 2 to give low friction contact and assist in providing low torque properties. A solid piston 13 is disposed within the cylinder 5 and is in sliding contact with the inner wall thereof. A cylinder space 20 is formed in the cylinder 5 between the piston 13 and the non-return valve 8 and communicates with the input port 6. One end of the piston 13 extends out of the cylinder and is rigidly attached to a disc-shaped end plate 14. This end plate 14 has a tubular extension 15 which extends externally of the cylinder 5 towards the housing base 2 and is spaced from the outer wall of the cylinder. The extension 15 terminates in an integral flange 16 which is directed away from the cylinder 5 and is spaced from the surface 11. The flange 16 is biased from the cover plate 3 by a helical return spring 17 which contacts the end plate 3 and the flange 16.

The cam system includes a ball 12, which acts as the cam member and the flange 16 which has a cam face 26 contacting the ball 12. The face 26 follows a helical path through a single turn relative to the longitudinal axis of the cylinder 5 and has an abrupt change of direction or drop-off 34 (see FIG. 5). As the body 10 is rotated in the operating direction the ball 12 rolls along the cam face 26 and forces the flange 16 towards the cover plate 3 against the return force of the spring 17. The piston 13 is thus moved out of the cylinder 5 due to its rigid mechanical connection with the flange 16. The spring 17 also prevents rotation of the flange 16 due to its frictional contact with the flange and cover plate 3 and the flange 16 is thus restrained to follow a reciprocating path. When the ball 12 reaches the drop-off point 34 on the cam face 26, the piston 13 is at its farthest spacing from the output port 7. With a small further rotation of the body 10 the ball 12 travels through the drop-off of the cam face 26 being forced to the lowest point on the cam surface by the flange 16 being forced from the cover plate by the spring 17. At this time the piston rapidly moves toward the output port 7. A cylindrical ball shield 19 is attached to the body 10 and extends towards the cover plate so that the ball 12 is retained between the cylinder 5 and this shield.

In an alternative form of the cam system the body 10 carries a helical cam face similar to cam face 26 and the flange 16 has an annular surface contacting the ball 12. This embodiment operates in a similar manner to the system described and rotation of the body 10 causes a reciprocating motion in the flange 16.

In FIG. 4 use of a bevelled ball support surface is illustrated with reference to this alternative embodiment.

As can be seen from FIG. 4 the ball 35 contacts a helical cam surface 29 along a path 32 and a ball support face 30 along a path 33. The cam path 32 has a radial distance B from the centre line 28 of the piston and cylinder and the length of the path 32 is greater than $2\pi B$ because it lies on a helical cam surface. The ball 35 contacts the ball support face 30 along a path 33 which is equal to $2\pi A$ where A is the radial distance between the path 33 and the centre line 28. A is greater than B due to the bevel on the face 30 and the dimensions of the face 30, cam surface 29 and ball 35 are selected so that the length of path 33 is equal to the length of path 32 so that as the cam body 36 rotates the ball 35 is always subject to a pure rolling motion. The ball 35 contacts the outer surface of the cylinder 38 (corresponding to cylinder 5 of FIG. 1) at 31 which serves to retain the ball in position between the cam surface 29 and support face 30.

The ball contacts cylinder 38 along path 31 which serves as the third locational point for the ball.

The relationship between the distances A, B and the diameter ($d$) of the ball 35 is $$2\pi A = \sqrt{(2\pi B)^2 + d^2}$$

Figure 2:
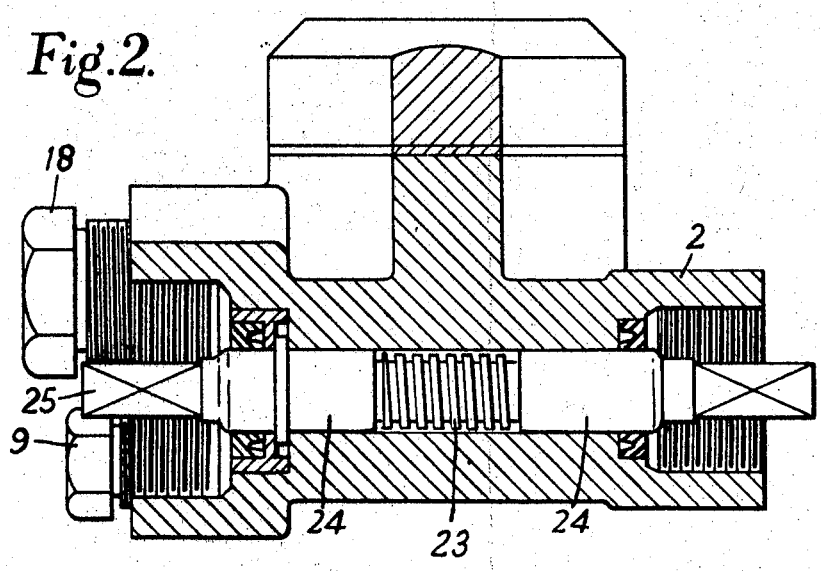
FIG. 2 is a sectional view along the line A—A of FIG. 1 viewed in the direction of the arrows.

Referring now to FIGS. 1 to 3:

The body 10 is rotated with the aid of an annular gear 22 integral with the body and meshing with a worm gear 23 carried on bearing surfaces 24 on the body 2 which is made of bearing metal. Alternatively, separate bushes can be provided between the worm gear shaft and body 2. The worm gear 23 is rotated by rotary power applied to the drive and 25 of the worm gear.

When the body 10 is rotated in the operating direction by the gears the ball 12 moves along the cam face 26 with a pure rolling action and the piston is moved out of the cylinder drawings fluid into the cylinder space 20 through the input port 6. The fluid supply enters the port 6 via the pump space 21 and the input pipe 18 from a suitable reservoir which is not shown. When the ball falls through the drop-off of the cam surface the return spring 17 forces the piston 13 towards the output port 7. When the piston passes and thus closes the input port 6, for the piston is in sealing contact with it, fluid is forced from the cylinder space 20 and through the non-return valve 8 via the output port 7. Thus fluid is pumped from a suitable reservoir through the output pipe 9. A non-return valve may also be included in the input pipe 18 so that the pumping action occurs when the piston commences its pump stroke.

If the fluid used is a lubricating fluid the gears 22, 23 will be lubricated because the gears mesh in the pump space.

When the body 10 is rotated in the opposite direction the ball 12 is carried around the cylinder in abutment with the drop-off of the cam surface. The dimensions of the components are selected so that the ball 12 does not run in contact with both the support surface 11 and the cam face 26.

I claim:
1. A fluid pump comprising in combination,
    (i) a cylinder having
    (ii) an inlet port and
    (iii) an outlet port,
    (iv) a non-return valve in said inlet port,
    (v) a non-return valve in said outlet port,
    (vi) a piston reciprocable within said cylinder,
    (vii) biasing means acting on said piston to bias same towards
    (viii) a helical cam system embracing said cylinder and cooperating with said piston to reciprocate same within said cylinder, said helical cam system comprising a helical cam surface and a cam member cooperating with said cam surface and revolvable about the cylinder relative thereto.
2. A fluid pump according to claim 1, wherein the cam member is constituted by a ball in rolling contact with a ball support surface, said ball support surface embracing said cylinder, and said helical cam surface.
3. A fluid pump according to claim 1, comprising an extension on said piston embracing said cylinder and cooperating with said cam system.
4. A fluid pump according to claim 2 wherein said ball support surface is bevelled to give a ball contact path substantially equal in length to the contact path on said helical cam surface.
5. A fluid pump according to claim 2 including a shield positioned radially outwardly of the ball to retain said ball in its path.
6. A fluid pump according to claim 1 wherein said biasing means biases said piston towards said outlet port.
7. A fluid pump according to claim 2 including a cam body in the cam system embracing said cylinder and rotatable relative thereto.
8. A fluid pump according to claim 7, wherein said cam body is journalled on said cylinder and a peripheral gear surface is present on said cam body.
9. A fluid pump according to claim 8 including a driven worm gear cooperating with said peripheral gear surface.
10. A fluid pump according to claim 2 wherein said cam surface has one drop-off.
11. A fluid pump according to claim 1 wherein said inlet valve is constituted by said inlet port being closable by said piston moving past it in sealing contact during a pump stroke.
12. A fluid pump comprising in combination, a cylinder, a piston reciprocally mounted in said cylinder, inlet port means for introducing fluid into said cylinder on a suction stroke of said piston, outlet port means for delivering fluid under pressure from said cylinder on a power stroke of said piston, means for closing said inlet port means on a power stroke of said piston, means for closing said outlet port means on a suction stroke of said piston, biasing means urging said piston toward one end of said cylinder, helical cam means in coaxial alignment around said cylinder, and cam follower means including ball bearing means engaging said helical cam means for interconnecting said cylinder and piston to move the latter relative to the former away from said one end upon rotation of said cam means.

References Cited
UNITED STATES PATENTS

| | | | |
|---|---|---|---|
| 1,866,217 | 7/1932 | Mayer | 103—157 |
| 2,845,875 | 8/1958 | Corbett | 103—153 |
| 3,022,742 | 2/1962 | Bowen | 103—153 |

HENRY F. RADUAZO, Primary Examiner

U.S. Cl. X.R.

92—129, 130; 417—490